United States Patent
Kuhnle et al.

(10) Patent No.: US 7,813,987 B1
(45) Date of Patent: Oct. 12, 2010

(54) ACTIVELY MANAGED EXCHANGE TRADED FUND USING AP REPRESENTATIVES FOR CREATION AND REDEMPTION

(75) Inventors: Paul Edward Kuhnle, Doylestown, PA (US); George Tedesche Simon, Evanston, IL (US); John Stuart Thomas, Morristown, NJ (US); Mark Steven Criscitello, Colts Neck, NJ (US); Daniel Joseph McCabe, Upper Saddle River, NJ (US)

(73) Assignee: D12 Ventures, LLC, Morristown, NJ (US)

( * ) Notice: Subject to any disclaimer, the term of this patent is extended or adjusted under 35 U.S.C. 154(b) by 0 days.

(21) Appl. No.: 11/758,564

(22) Filed: Jun. 5, 2007

(51) Int. Cl.
*G06Q 40/00* (2006.01)
(52) U.S. Cl. .................. 705/36 R; 705/35; 705/37
(58) Field of Classification Search .......... 705/35, 705/37, 36 R
See application file for complete search history.

(56) References Cited

U.S. PATENT DOCUMENTS

| | | | | |
|---|---|---|---|---|
| 6,879,964 | B2* | 4/2005 | Sauter et al. | 705/37 |
| 7,099,838 | B1* | 8/2006 | Gastineau et al. | 705/35 |
| 7,461,027 | B1* | 12/2008 | Volpert | 705/37 |
| 2003/0065519 | A1* | 4/2003 | Gibson et al. | 705/1 |
| 2004/0186803 | A1* | 9/2004 | Weber et al. | 705/35 |
| 2004/0186830 | A1* | 9/2004 | Delic et al. | 707/3 |
| 2005/0187857 | A1* | 8/2005 | Tull et al. | 705/37 |
| 2005/0262010 | A1* | 11/2005 | Tull et al. | 705/37 |
| 2006/0100955 | A1* | 5/2006 | Baldassini et al. | 705/37 |
| 2006/0253376 | A1* | 11/2006 | Seale et al. | 705/37 |
| 2007/0016514 | A1* | 1/2007 | Al-Abdulqader et al. | 705/37 |
| 2007/0022039 | A1* | 1/2007 | Brennan | 705/37 |
| 2007/0027790 | A1* | 2/2007 | Gastineau et al. | 705/36 R |
| 2007/0078738 | A1* | 4/2007 | Levin et al. | 705/36 R |
| 2007/0239584 | A1* | 10/2007 | Fross et al. | 705/36 R |
| 2007/0294161 | A1* | 12/2007 | Johnson et al. | 705/37 |
| 2009/0063363 | A1* | 3/2009 | Present et al. | 705/36 R |
| 2009/0063366 | A1* | 3/2009 | Friedman et al. | 705/36 T |
| 2009/0083196 | A1* | 3/2009 | Volpert | 705/36 R |

FOREIGN PATENT DOCUMENTS

WO          WO 0172106 A2 * 10/2001

OTHER PUBLICATIONS

Schmerken, Ivy "Asset Managers Push Custodians to Offer Independent Pricing Services for OTC Derivatives", Feb. 13, 2007.*

(Continued)

*Primary Examiner*—Narayanswamy Subramanian
*Assistant Examiner*—Ryan D Donlon
(74) *Attorney, Agent, or Firm*—Foley & Lardner LLP

(57) ABSTRACT

An ETF creation and redemption mechanism for use in managed Exchange Traded Fund (ETF) that retains the confidentiality of the ETF assets. An agency relationship is established with an AP representative who receives the underlying securities from the ETF as part of a like kind exchange in a redemption event. In an alternative embodiment, the AP representative may be used to obtain the portfolio securities as directed by the ETF to perform a creation event. The representative relationship is preferably established by an authorized participant (AP) according an agreement between the AP and the ETF.

51 Claims, 3 Drawing Sheets

OTHER PUBLICATIONS

News Journal Editor, "Blind trusts for trust To avoid conflict of private gain by public action" Mar. 10, 2006, News Journal, p. 04.*

U.S. Securities and Exchange Commision, "SEC Concept Release: Actively Managed Exchange-Traded Funds", May 18, 2004 17 CFR Part 270.*

Poterba et al, "Exchange-Traded Funds: A New Investment Option for Taxable Investors", May 2002, The American Economic Review, vol. 92, No. 2, pp. 422-427.*

Deville, Laurent; "Exchange Traded Funds: History, Trading and Research", Jun. 2006, Paris-Dauphine University.*

Dellva, Willfred; "Exchange-Traded Funds Not for Everyone", Apr. 2001, Journal of Financial Planning.*

Rosella et al, "The Evolution of the Exchange-Traded Fund: Is Active Management on the Horizon?", 2006, Journal of Investment Compliance vol. 7 No. 3 pp. 44-50.*

Light, "Will Stock-Picking Managers Be the Next Big Thing for ETFs?", *The Wall Street Journal*, Jan. 6, 2010, 3 pages [Underlining and Bolding added.].

Marquez, "Actively managed ETFs pique interest of big fund companies Funds and providers both expect to more than double in 2010", *InvestmentNews*, Jan. 4, 2010, 3 pages. [Underlining and Bolding added.].

DR, "Actively Managed ETFs are One Step Closer", DoughRoller, May 2010, 3 pgs.

Nigam, Shishir, "Disclosure of Actively Managed ETFs: Separating Fact From Fiction", Seeking Alpha α, Apr. 14, 2010, 2 pgs.

Maxfy, Daisy, "A More Active Role—*Mutual funds, beware: ETFs increasingly are moving beyond indexes*", The Wall Street Journal, Jul. 6, 2009, 3 pgs.

* cited by examiner

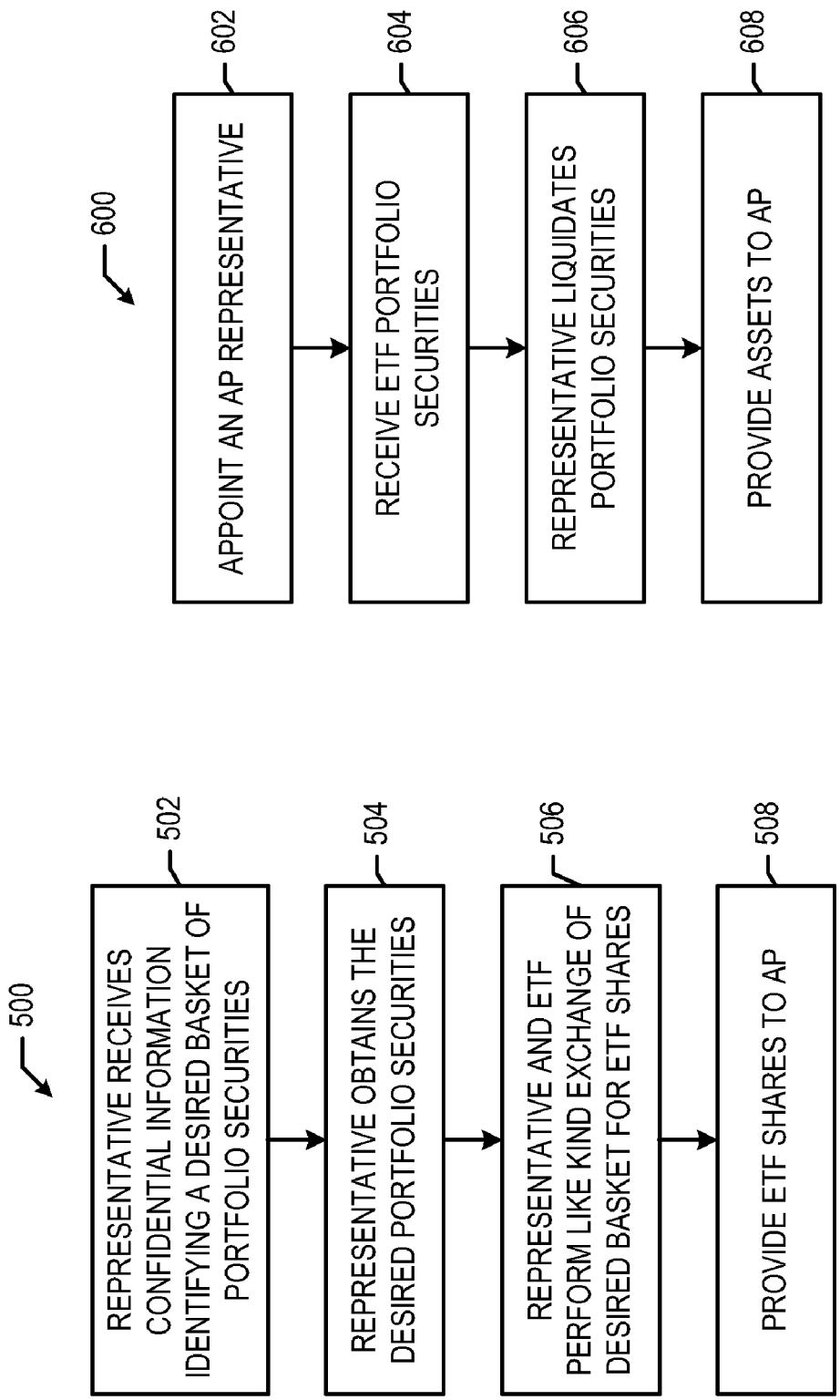

ACTIVELY MANAGED EXCHANGE TRADED FUND USING AP REPRESENTATIVES FOR CREATION AND REDEMPTION

FIELD OF THE INVENTION

The present invention relates to collective investment vehicles. More particularly, the present invention relates to a mechanism for managing an actively managed exchange traded collective investment vehicle.

BACKGROUND

Exchange Traded Funds, or ETFs, are a type of collective investment vehicle that owns a portfolio of securities and issues shares which are traded on a stock exchange or other organized market. Shares of an ETF are created by authorized participants (AP) by either delivering cash or a portfolio of securities or a combination of cash and securities to the ETF and receiving ETF shares in return. ETF shares may also be redeemed by APs by delivering ETF shares and receiving cash, portfolio securities or a combination thereof. Only an AP may create or redeem ETF shares. All other investors buy or sell ETF shares in an organized market.

All ETFs must be approved for issuance by the Securities and Exchange Commission (SEC). To date, all SEC-approved ETFs attempt to replicate the performance of a benchmark index. The SEC has not approved an ETF that is managed without reference to an index. An ETF that is managed without reference to an index is called an actively managed ETF.

In order to approve an ETF for issuance, the SEC has required that the market trading the ETF disseminate an indicative value of the ETF shares every 15 seconds during trading hours. Moreover, the SEC requires that any ETF that may be created by delivery of portfolio securities or redeemed in exchange for receipt of portfolio securities, publish the holdings of the fund every day. These two requirements have impeded the ability of ETF sponsors to create an actively managed ETF.

Some managed ETFs have been proposed based on securities other than equity securities. For example, a managed ETF has been proposed by Bear Stearns Asset Management, and is known as the Bear Stearns Current Yield Fund. The prospectus of the Current Yield Fund indicates that the fund assets will comprise mainly fixed income obligations, and explicitly states that it will not invest in "common stocks, preferred stocks, warrants, or other equity securities." By restricting the portfolio securities to fixed income/debt securities, the importance of maintaining the confidentiality of the identity of the portfolio securities is decreased. That is, because these types of securities are quite fungible, and alternative equivalent securities are readily identifiable, there is little or no risk that the pricing of the portfolio securities will be affected by disclosure of their identity. In contrast, managed ETFs that focus primarily on equity securities remain impractical due to the risk that public disclosure of the specific equity securities in the fund portfolio may provide an indication of the ETF manager's investment strategy, thereby allowing the public to take on anticipatory positions in those specific securities.

In addition, a mechanism has been proposed to determine and publish pricing information of an actively managed ETF, and is described in U.S. Pat. No. 6,941,280 to Gastineau, the contents of which are hereby incorporated herein by reference. Nevertheless, these prior efforts remain deficient, and do not provide sufficient mechanisms to enable the existence of a managed equity-based ETF.

BRIEF SUMMARY OF THE INVENTION

Creation and redemption mechanisms for an Exchange Traded Fund (ETF) are described. The mechanisms preferably provide computer systems and automated methods for an AP to create ETF shares without the AP directly delivering the portfolio securities to the ETF and to redeem the ETF shares without learning the identity of the underlying portfolio securities. The creation and redemption mechanisms may involve the use of a blind trust, power of attorney, agency or bailment agreement or any other mechanism that withholds the identity of the portfolio securities from the AP.

In one preferred embodiment, the method of administering an ETF includes a method of creating shares in the ETF. In one embodiment, the AP may provide the ETF with cash, which is referred to as a cash creation. The amount of cash required is preferably determined in response to the number of ETF shares in a creation or redemption event and the net asset value of the ETF's assets. In an alternative embodiment, the method includes appointing an authorized participant representative (AP representative) to act on behalf of each AP for purposes of creating shares in the ETF. In this embodiment, when an AP creates ETF shares, it may deposit cash with the representative with instructions to provide the cash to the ETF (also a type of cash creation). Alternatively, the AP may provide instructions to the AP representative to buy and/or borrow the necessary portfolio securities to deliver to the ETF. In this embodiment, the AP representative is provided with confidential data records containing information regarding the desired contents of a creation basket. In embodiments where the securities are borrowed, the AP representative is authorized to pay an appropriate fee to the entity that loaned the securities. To complete the creation, the ETF shares may be electronically transferred directly to the AP, or may be electronically transferred to the AP via the AP representative.

In particular, creations may be performed by an AP representative electronically receiving confidential creation-basket data records specifying a desired basket of portfolio securities for a creation event; the AP representative obtaining the desired basket of portfolio securities; the AP representative electronically transferring the desired basket of portfolio securities to the ETF; wherein the AP does not have access to the confidential creation-basket data records specifying the desired basket of portfolio securities.

In an additional embodiment, the method of administering the ETF includes a method of redeeming shares in the ETF. In this embodiment, an AP may redeem ETF shares by providing the ETF with the ETF shares directly, or may provide them to the ETF via the AP representative. To complete the redemption, the ETF will deliver portfolio securities to the AP representative, who will then sell those securities on the open market (or return them, if borrowed) on behalf of the AP without disclosing their identity to the AP, and remit the cash proceeds to the AP.

In particular, the method redeeming shares of an ETF includes providing a request to redeem ETF shares; an AP representative electronically receiving portfolio securities from the ETF as a result of a redemption of ETF shares, while ensuring that the identity of the portfolio securities is not disclosed to the AP; the AP representative obtaining transferable assets in exchange for the portfolio securities; and providing the transferable assets to the AP.

In a further alternative embodiment, redemptions may include receiving a request to redeem ETF shares; identifying a redemption basket of portfolio securities; and electronically transferring the redemption basket of portfolio securities to an AP representative as part of a redemption of ETF shares, while ensuring that the identity of the redemption basket of portfolio securities is not disclosed to the AP.

Preferably, the relationship with the AP representative is established by the AP as part of the agreement between and AP and the ETF, and the agreement is preferably an exhibit to the ETF registration statement filed with SEC. The AP representative is preferably selected by the ETF, or at least approved by ETF, as set out in the AP agreement. The actions of the AP representative are governed by instructions according to the AP agreement, and the instructions ensure that the identity of the underlying portfolio securities is not disclosed to the AP.

Additionally, the receipt of the underlying portfolio securities by the AP representative (e.g., into the blind trust) is part of a like-kind exchange of ETF shares and the underlying portfolio securities between an AP and an ETF. Note that in one embodiment, an electronic agreement is provided to the AP setting forth the AP representative's obligations to the AP.

In one further alternative preferred embodiment, the ETF disseminates an intraday indicative value (IIV) of the ETF by providing the contents of its portfolio to a pricing service pursuant to the terms of a confidentiality agreement. In another embodiment, the portfolio is divided among two or more pricing services, such that neither pricing service knows the identity of the entire portfolio. In this embodiment, the ETF or listing exchange recombines the prices to obtain a complete intraday indicative value for public dissemination.

Preferably, the IIV is determined by electronically transmitting a plurality of partial position data records containing partial position information to a plurality of pricing agents; electronically receiving partial pricing data; automatically computing an IIV; and electronically publishing the IIV via a data communication feed. The methods may be performed using a computer readable storage medium having stored therein instructions to cause a microprocessor to: electronically receive partial pricing data and automatically computing an IIV; and, electronically transmit the IIV via a data communication feed. The computer readable storage medium may also include instructions to transmit a plurality of partial position data records containing partial position information to a plurality of pricing agents.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 5 and 6 are flow charts depicting some preferred embodiments of creation and redemption events, respectively.

DETAILED DESCRIPTION

Figure 1A:
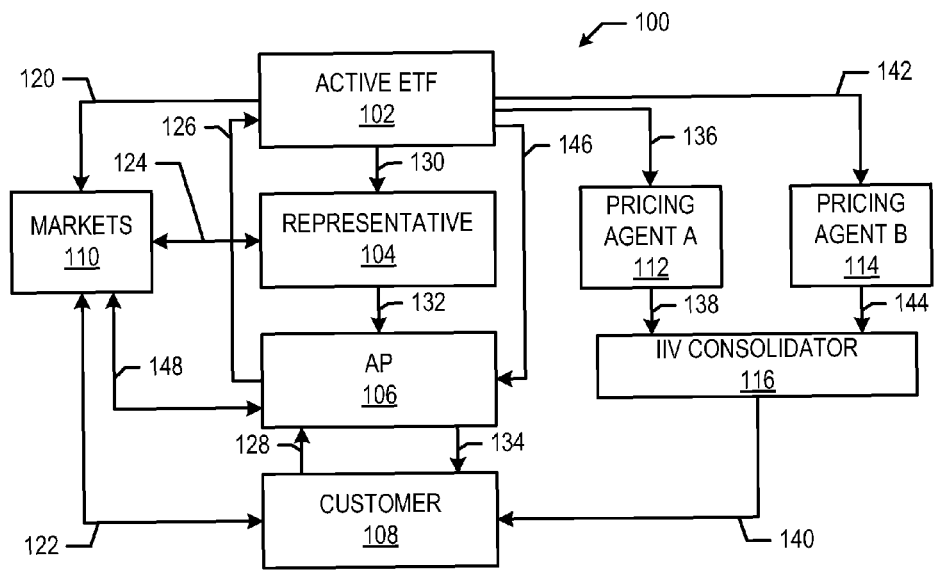
FIG. 1A is a block diagram depicting certain aspects of preferred ETF and AP representative combination, and transactions involved in one embodiment of a creation event.

With reference to FIG. 1A, a preferred system and method 100 of administering an exchange traded fund (ETF) will be described. While the methods and systems described herein may be used for any type of ETF, they are particularly beneficial in conjunction with actively managed ETFs. The ETF 102 may engage in market transactions 120 with the markets 110. Customers 108 and the agent or AP representative 104 may also engage in market transactions 122, 124, respectively. The authorized participant (AP) 106 interacts with the ETF 102 either directly as shown by transaction 126, or via a AP representative 104 as shown by transactions 130, 132. The AP 106 may buy and sell ETF shares to customers 108 as shown by transaction 128, 134, or in the market 110 as shown by transaction 148.

The transactions described herein involve the transfer of securities between various entities such as the ETF, the AP and the AP representative. It should be understood that the transfer of such securities is preferably performed electronically via suitable messaging formats and systems well known to those of skill in the art. For instance, the DTC (Depository Trust Company) provides a participant terminal system for transferring securities using electronic messaging. Thus, an electronic transfer of securities is preferably performed by sending an electronic message to the DTC. The DTC then performs a book entry movement by executing an accounting entry to move securities from one account to another account.

One aspect of an ETF is the calculation and reporting of the intraday indicative value, or IIV. In order to maintain the confidentiality of the holdings the managed ETF, the ETF 102 may provide partial position information 136, 142 to a plurality of pricing agents, such as pricing agent A 112 and pricing agent B 114. The pricing agents then provide partial pricing data 138, 144 to the IIV consolidator 116. The IIV consolidator 116 consolidates the partial pricing data into an IIV, and provides the ETF IIV 140 to customers 108 (and to markets 110 generally). By using a plurality of pricing agents, the ETF manager is able to maintain the confidentiality of the precise makeup of the ETF 102.

The ETF 102 is preferably an actively managed fund wherein the ETF manager engages in transactions in the market 110 as indicated by arrow 120 in order to alter the contents or holdings of the ETF 102. The ETF manager may also, or alternatively, alter the holdings of the ETF through a series of creation and redemption events as described herein.

The AP is preferably a bank, broker-dealer, exchange specialist, market maker, arbitrageur or, possibly, an institutional investor. The AP enters into an agreement with the ETF setting the terms for the creation and redemption of the ETF's shares in creation unit aggregations. Preferably, a representative relationship such as via a blind trust or other agency vehicle is established by the AP as part of the agreement between and AP and the ETF. The actions of the AP representative (e.g., trustee of the blind trust, agent, etc.) are governed by instructions agreed to by the AP and AP representative, and the instructions ensure that the identities of the underlying securities are not disclosed to the AP.

Figure 1B:
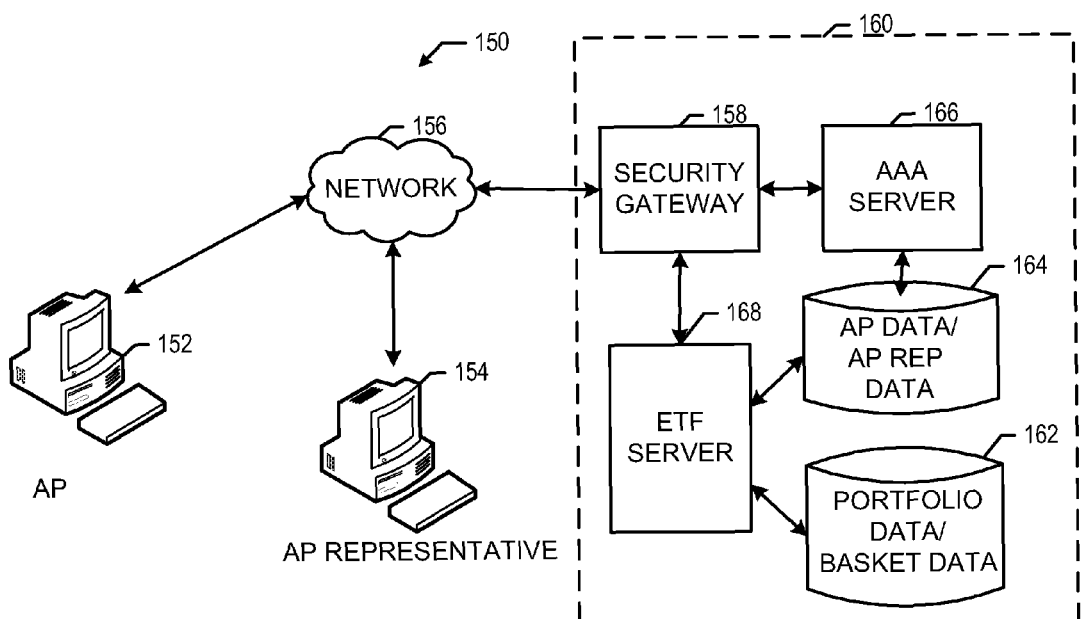
FIG. 1B is a block diagram of a preferred computer system for implementing certain aspects of the ETF.

With reference to FIG. 1B, a computer system, or system networked computers 150, may be used to implement various transactions and data transfers associated with operation of the ETF described herein. The system 150 preferably includes an AP workstation 152, AP representative workstation 154, and ETF system 160, which preferably includes ETF server 168, database 162, which contains information relating to the ETF portfolio securities and creation and redemption baskets, and database 164, which contains data relating to the APs and AP representatives, such as identification information, password files, encryption keys, other access authorization and accounting (AAA) data. In this regard, ETF system 160 may optionally include AAA server 166 and a security gateway 158. The various components communicate over network 156, which may be a public network such as the Internet, or a private network including leased lines, or a virtual private network using virtual private network (VPN) protocols.

The various transactions and transfers described herein preferably take place using the systems and components shown in FIG. 1B, although one of skill in the art will appreciate that many variations of the system may be implemented without departing from the scope of the invention. Suitable networking protocols may be used, including the Transport Control Protocol/Internet Protocol (TCP/IP) suite of protocols, and also including the HyperText Transport Protocol (HTTP) and associated security protocols HTTPS, and other mechanisms such as Virtual Private Networking (VPN), Secure Sockets Layer (SSL), Transport Layer Security (TLS), tunneling protocols such as Generic Routing and Encapsulation (GRE), Layer 2 Tunneling Protocol (L2TP), and the like. Another protocol that may be used to facilitate the transactions and associated messaging described herein is the Financial Information eXchange (FIX) Protocol, which is a messaging standard developed specifically for the real-time electronic exchange of securities transactions. FIX is a public-domain specification owned and maintained by FIX Protocol, Ltd. In addition, some of the transactions may be communicated in a manual fashion, such as via telephone or textual messaging (email, and the like), whereupon the relevant transaction information may be entered into the appropriate computer systems.

FIG. 1A depicts a method 100 and the transactions associated with a cash creation event. In particular, AP 106 provides cash to the ETF 102 as shown by transaction 126. In one embodiment, the cash equivalent of a creation basket is automatically calculated in response to a number of ETF shares in a creation event and the net asset value of ETF shares. In return, the ETF 102 issues ETF shares to the AP 106 as shown by transaction 146, which preferably takes place via electronic transfer from ETF system 160 directly to the AP computer system 152 using network 156. Note that in this preferred embodiment the AP representative 104 is not used in the creation event.

Figure 2:
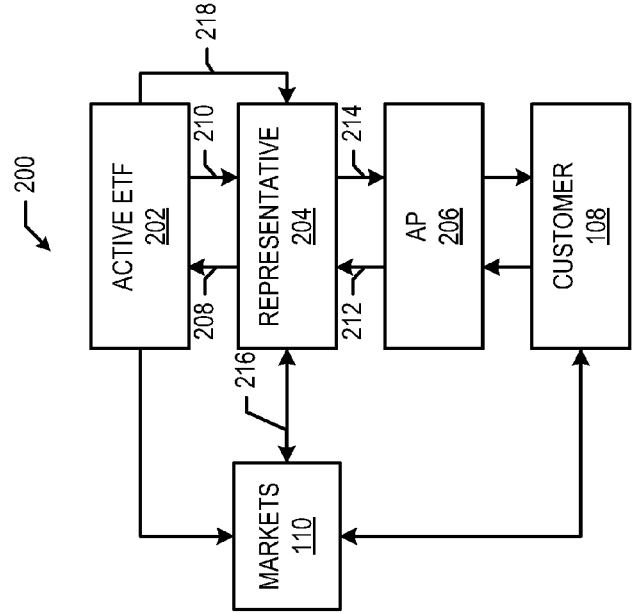
FIG. 2 is a block diagram depicting transactions relating to an alternative preferred method of a creation event.

FIG. 2, in contrast, depicts the use of the AP representative 204 in the creation event. In method 200, the AP 206 provides the AP representative 204 with cash as shown in transaction 212. Preferably, the AP representative electronically receives a cash transfer, the cash being a value equivalent of a creation basket. In order to assemble a creation basket of securities for delivery to the ETF, the ETF 402 provides AP representative 204 with information 218 to identify the desired securities for the creation basket.

In one preferred embodiment, the AP representative electronically receives confidential creation-basket data records specifying a desired basket of securities for a creation event. The creation-basket data records are preferably automatically created in response to an ETF manager identifying securities for the creation basket. The system then creates one or more confidential creation-basket data records specifying a desired basket of securities for a creation event. In one embodiment, the ETF manager accesses a portfolio management interface associated with ETF server 168 that allows the manager to identify the creation baskets. The interface preferably allows the ETF manager to prioritize the order in which the different creation baskets are used when performing creation events. In addition, the interface to ETF server 168 allows designation of creation baskets in advance of any actual creation notifications. System 160 then electronically transfers the confidential creation-basket data records to the AP representative system 154, while ensuring that the identity of the redemption basket of portfolio securities is not disclosed to the AP.

The systems described above may include computer readable storage media for use with computer systems to effectuate certain steps described herein. In particular, the computer-readable media may contain instructions to cause a microprocessor to execute the following steps: receiving a request to create ETF shares; and transmitting confidential creation-basket data records specifying a desired basket of securities for a creation event.

While maintaining the information 218 in confidence, and not disclosing the information 218 to the AP 206, the AP representative 204 acquires the desired portfolio securities. Preferably the AP representative obtains the desired portfolio securities via market 110 as shown by transaction 216. In an alternative embodiment, the AP representative 204 may obtain the underlying securities for the creation basket by borrowing some or all of the desired basket of securities. The AP representative then provides the desired creation basket to ETF 202 as shown by transaction 208. The ETF 202 then delivers shares of the ETF to the AP representative 204 as shown by transaction 210. Preferably, the AP representative electronically transfers the desired basket of securities to the ETF. That is, transaction 208 is preferably performed by sending an electronic message to the DTC with instructions to transfer the desired securities to the ETF 202. AP representative 204 then provides the ETF shares to AP 206 as shown by transaction 214.

Information 218 may take the form of a confidential portfolio composition file provided only to AP representatives for the purposes of creation events. The ETF may formulate unique composition files reflecting the ETF manager's desired acquisitions. The data may take the form of a plurality of confidential creation-basket data records specifying a desired basket of securities for a creation event. The acquisitions thus effectuated via creation events, together with the elimination or removal of specific underlying security assets via redemptions, allow the ETF manager to adjust or alter the portfolio composition without purchasing or selling securities directly.

Figure 3:
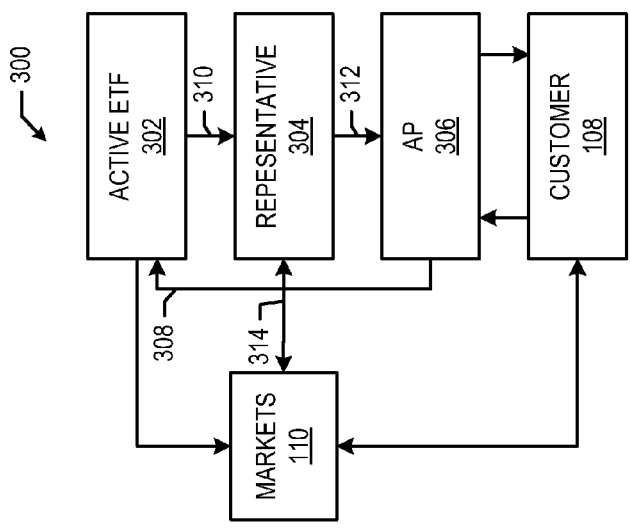
FIG. 3 is a block diagram depicting certain transactions relating to a redemption event using an ETF and an AP representative.

As shown in FIG. 3, one preferred method 300 of performing a redemption includes the AP 306 providing ETF shares to the actively managed ETF 302 in transaction 308. In exchange for the receipt of ETF shares, ETF 302 provides a basket of portfolio securities to the AP representative 304 as shown by transaction 310. Transaction 308 is preferably performed by the AP sending a message to the DTC to transfer ETF shares to the ETF, while transaction 310 is performed by the ETF sending a message to the DTC to transfer particular portfolio securities to the AP representative 304.

The selection of the underlying securities may be made by the ETF manager so as to alter or adjust the holdings of the ETF 302. In addition, low-cost basis securities held in the ETF portfolio may be provided so as to retain only higher-cost basis securities. The AP representative 304 then liquidates the portfolio securities, preferably through market transactions 314. Note that although ETF 302 provides the portfolio securities to AP representative 304, the portfolio securities are assets rightfully belonging to AP 306.

The provisions of AP representative agreement require the AP representative 304 to maintain the confidentiality of the identity of the portfolio securities provided to the AP representative 304 by ETF 302. Once the underlying securities are held by the AP representative 304, the AP representative 304 liquidates them, preferably by selling them in the market 110, as shown by transaction 314. The AP representative is then able to provide AP 306 with cash, or other suitable instrument as shown by transaction 132.

Figure 4:
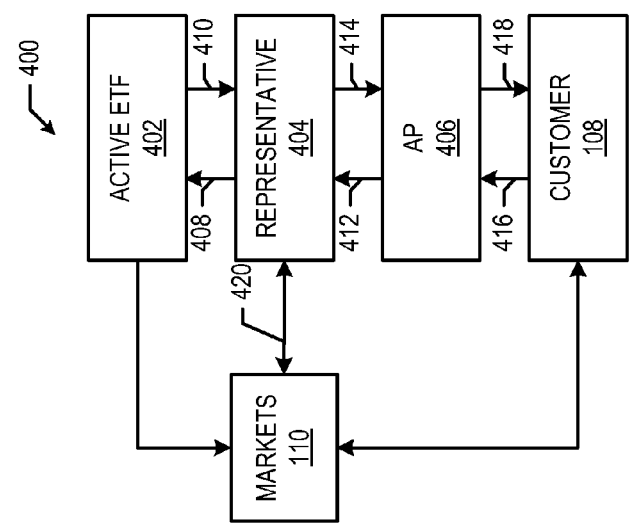
FIG. 4 is a block diagram depicting transactions used in an alternative redemption event.

With reference to FIG. 4, an alternative method 400 of performing a redemption event will be described. AP 406 may provide AP representative 404 with an amount of ETF shares or a sufficient amount of cash in transaction 412. The AP representative 404 may then use the ETF shares (or buy ETF shares using the cash) and provide them to ETF 402 in transaction 408, preferably performed via a DTC transfer message. ETF 402 also provides a basket of portfolio securities to AP representative 404 as shown by transaction 410 via a DTC transfer message. Again, the identity of the basket of portfolio securities is held in confidence by AP representative 404, and such information is not provided to AP 406, or to any other individual or entity that is not obligated to maintain its confidentiality. The AP representative 404 then liquidates the portfolio securities, preferably using the market 110 as shown by transaction 420. The AP representative 404 then provides cash or other suitable instruments as shown by transaction 418.

Strictly from the perspective of the ETF, the system 160 receives a request to redeem ETF shares. The request may come directly from the AP computer system 152, or via the AP representative system 154. Alternatively, it may be communicated to system 160 via alternative communication methods, including phone, fax, email, etc. The ETF system then identifies a redemption basket of portfolio securities. This is preferably performed by an ETF manager, who creates one or more confidential redemption-basket data records specifying a desired basket of securities for a redemption event. In one embodiment, the ETF manager accesses a portfolio management interface associated with ETF server 168 that allows the manager to identify the redemption baskets. The interface preferably allows the ETF manager to prioritize the order in which the redemption baskets are used when performing redemption events. In addition, the interface to ETF server 168 allows designation of redemption baskets in advance of any actual redemption notifications. System 160 then electronically transfers the redemption basket of portfolio securities to the AP representative system 154, while ensuring that the identity of the redemption basket of portfolio securities is not disclosed to the AP.

With reference to FIG. 5, a method 500 of performing a creation event will be described. The AP may establish a relationship with a representative such as by a blind trust agreement, power of attorney, agency agreement or bailment, or other suitable agency vehicle. The AP may provide the AP representative with cash, the cash being a value equivalent of a creation basket. At step 502 the AP representative may be given confidential information from the ETF regarding a desired basket of portfolio securities for the creation event. The AP representative may then obtain the portfolio securities at step 504, and then engage in a like kind exchange of the portfolio securities for shares in the ETF with the ETF at step 506. For a creation basket, the AP representative may obtain the underlying securities on the open market using the cash. Alternatively, the AP representative may borrow the underlying securities from another entity. The AP representative is authorized to pay an appropriate fee to the entity that loaned the underlying securities. The determination of whether to buy or borrow the portfolio securities may be based on the representative relationship agreement, and may be based on relative costs of engaging in the transactions on behalf of the AP. At step 508, the ETF shares are provided to the AP, thereby allowing the AP to sell the ETF shares in the market. The ETF shares may be provided directly to the AP from the ETF, or may pass through the AP representative.

With reference to FIG. 6, one preferred method 600 will be described. Method 600 of administering an ETF includes appointing an AP representative at step 602. The AP representative takes actions on behalf of the AP. In method 600, the AP representative receives the portfolio securities from the ETF at step 604. In the case where a blind trust is used, the beneficiary of the blind trust is the AP associated with the ETF. The trust is a blind trust because the trustee manages the assets of the trust, and acts on behalf of the AP beneficiary, without disclosing the identity of the trust assets (the portfolio securities exchanged with the ETF) to the AP. At step 606 the AP representative liquidates the portfolio securities while ensuring that the identity of the portfolio securities is not disclosed to the AP. The AP representative preferably liquidates the portfolio securities by selling them in the market, and the AP representative then provides the funds to the AP. Alternatively, the trustee may obtain other transferable assets and provide them to the AP.

In some preferred embodiments, the basket of securities selected for delivery to the AP representative may be made up of a proportionate share of all the securities held by the ETF. Alternatively, the basket composition may be determined at the discretion of the ETF manager. In this way, the manager may selectively reduce the fund's holdings in one or more particular securities. In some embodiments it may be desirable to place some limitations on the basket of portfolio securities provided to the AP representative. Primarily, any such limitations or restrictions are intended to ensure that the selection of the portfolio securities delivered during a redemption does not place an undue burden on the AP representative. In this regard, the manager may be required to ensure that the basket does not include an undue concentration of any particular security. The concentration of any security may be specified as a percentage of the overall value of the basket. Alternatively, the basket may be restricted based in part on the relative liquidity of the securities. That is, the quantity of any particular security in the redemption basket may be limited by a percentage of the average daily trading volume of that security. Preferably the ETF server 168 includes a software module to ensure the redemption baskets comply with the necessary restrictions.

The redemption events include providing the ETF with ETF shares in exchange for the portfolio securities. While the AP representative preferably always receives the portfolio securities from the ETF during redemption, the ETF shares may be provided directly to the ETF by the AP. Alternatively, the AP may first provide the AP representative with the shares of the ETF, thereby allowing the AP representative to provide the ETF shares to the ETF as part of a redemption event.

One further aspect of the ETF is the calculation and reporting of the intraday indicative value, or IIV. The IIV may also be referred to as the underlying trading value, indicative portfolio value, or the like. In order to maintain the confidentiality of the holdings of the managed ETF, the ETF 102 may provide partial position information 136, 142 to a plurality of pricing agents, such as pricing agent A 112 and pricing agent B 114. Preferably, a plurality of partial position data records containing partial position information is electronically transmitted to a plurality of pricing agents. The partial position information includes security identifiers and corresponding quantity information, and may include only a subset of the portfolio holdings (a subset of the individual security identifiers, or a subset of the respective quantity, or a combination thereof). The partial position information 136, 142 may also include some erroneous stock identifiers and/or the ETF may maintain a token number of a variety of securities in order to further mask the exact makeup of the ETF holdings. The pricing agents then provide partial pricing data 138, 144 to the intraday indicative value (IIV) consolidator 116. Preferably, the consolidator 116 electronically receives the partial pricing data. The partial pricing data is preferably the value of the partial positions. The IIV consolidator 116 may then combine the partial pricing data into a composite consolidated price, preferably using a secure server for automatically computing an intraday indicative value (IIV). In the event that erroneous stock identifiers and positions were included in the partial position information, these values are subtracted by the IIV consolidator 116 during the calculation.

Alternatively, the IIV consolidator 116 may be the ETF custodian, or another entity that has authorized access to the confidential identity of the holdings of the managed ETF, and may compute the pricing information directly without the use of a pricing agent. The IIV consolidator provides ETF quotes 140 to customer 108 (and to markets 110 generally) by electronically publishing the IIV via a data communication feed. By using a plurality of pricing agents, the ETF manager is able to maintain the confidentiality of the precise makeup of the ETF 102.

The system described above may include computer readable storage media for use with computer systems to effectuate certain steps described herein. In particular, the computer-readable media may contain instructions to cause a microprocessor to execute the following steps: electronically receiving partial pricing data and automatically computing an intraday indicative value (IIV); and, electronically transmitting the IIV via a data communication feed. In addition, instructions may include those for transmitting a plurality of partial position data records containing partial position information to a plurality of pricing agents.

An exemplary embodiment of the invention has been described above. Those skilled in the art will appreciate that changes may be made to the embodiment described without departing from the true spirit and scope of the invention as defined by the claims.

We claim:

1. A method for administering an actively-managed exchange traded fund (ETF) with a confidential portfolio of securities, in relation to one or more authorized participants (AP's), comprising:
performing a creation event, comprising:
receiving an asset from one of the AP's in relation to the creation event;
issuing, by one or more computers and an electronic network, one or more ETF shares directly or indirectly to the respective one AP based on the asset received;
obtaining securities for the actively-managed ETF to become a part of the confidential portfolio of securities;
obtaining or creating an electronic record of security identifiers for the confidential portfolio of securities held by the ETF;
calculating automatically an intraday indicative value (IIV), by one or more computers programmed to calculate the IIV, the calculating based on or derived from the electronic record of the confidential portfolio of securities in the actively-managed ETF while maintaining confidentiality of the confidential portfolio of securities held by the actively-managed ETF;
disseminating electronically or having disseminated electronically the IIV via an electronic data communication feed and one or more computers;
performing a redemption event, comprising:
receiving electronically, by one or more computers and an electronic network, one or more shares of the ETF for a given AP;
identifying securities for the redemption event comprising at least a portion of the confidential portfolio of securities; and
sending, by one or more computers and an electronic network, an electronic message to transfer the identified securities directly or indirectly to an electronic account of an authorized participant representative (AP representative), acting on behalf of the given AP for which the ETF shares were received, which AP representative is governed by an agreement to maintain the portfolio of securities confidential from the AP; and further comprising:
entering an agreement with the one AP to establish the respective AP representative to act for the respective one AP in at least one or more redemption events with the ETF, with the agreement comprising terms that govern the actions of the AP representative and state that an identity of securities in the confidential portfolio of securities of the ETF is not to be disclosed to the one AP, and
wherein the receiving an asset from the one AP for the creation event comprises receiving one or more securities for a creation basket in an account transfer from or on behalf of the AP and/or cash from or on behalf of the AP or a combination thereof.

2. The method of claim 1, wherein the asset is cash.

3. The method of claim 1, wherein the sending an electronic message to transfer step in the redemption event comprises sending the electronic message, by one or more computers, to cause transfer of one or more of the identified securities to the AP representative as part of a like-kind exchange for the one or more ETF shares.

4. The method of claim 1, further comprising:
entering one or more agreements by providing, by one or more computers, an electronic agreement to a respective one of the AP's setting forth the AP representative's obligations to the AP.

5. The method of claim 1, wherein the AP representative is a trustee of a blind trust, and the AP is the beneficiary of the blind trust, and the trustee of the blind trust withholds the identity of the confidential portfolio securities from the AP and operates to liquidate the identified securities transferred to the trustee.

6. The method of claim 1, wherein the AP representative is an agent appointed by a power-of-attorney.

7. The method of claim 1, wherein the AP representative is appointed by one of an agency agreement and a bailment agreement.

8. The method of claim 1, further comprising the steps:
electronically receiving a message to transfer ETF shares by the AP representative; and
the AP representative sending an electronic message, by one or more computers, to cause transfer of the ETF shares to the ETF as part of a redemption event.

9. The method of claim 1, wherein the receiving an asset step comprises:
receiving electronically, by one or more computers, as part of the creation event, a cash equivalent of a creation basket of securities in the confidential portfolio of securities.

10. The method of claim 1, further comprising:
calculating automatically by one or more computers, a cash equivalent of a creation basket in response to a designation of a number of ETF shares for a creation event and a net asset value of ETF shares;

issuing electronically one or more ETF shares based on the number of ETF shares for the creation event.

11. The method of claim 1, wherein one or more electronic communications with the AP representative are made on a network through a security gateway.

12. The method of claim 1, further comprising:
providing an instruction to the AP representative to purchase some of the securities identified in the electronic record of the confidential portfolio of securities in the ETF and to obtain some of the securities identified in the electronic record of the confidential portfolio of securities in the ETF by borrowing the securities.

13. The method of claim 1, wherein the obtaining or creating the electronic record of the confidential portfolio of securities in the ETF comprises obtaining for each of a plurality of identified securities in the electronic record a percentage of an overall value in the confidential portfolio of securities in the ETF.

14. The method of claim 1, further comprising:
determining by one or more computers for a particular one of the securities identified for the redemption event a quantity of the identified particular security based on a relative liquidity of the particular security during a period.

15. The method of claim 1, wherein the step of obtaining or creating an electronic record comprises updating, by one or more computers, an electronic record with the identity of securities in the confidential portfolio of securities of the ETF and including in this electronic record one or more erroneous stock identifiers; and further comprising
transmitting electronically by one or more computer to a pricing agent this electronic record that was updated.

16. The method of claim 1, wherein the step of obtaining or creating an electronic record comprises creating, by one or more computers, an electronic record with the identity of securities in the confidential portfolio of securities of the ETF and including in this electronic record a number of at least one security; and further comprising
transmitting electronically by one or more computer to a pricing agent this electronic record.

17. The method of claim 1, further comprising:
identifying electronically one or more securities for a redemption event in advance of receiving a notification of a redemption event.

18. The method of claim 1, wherein the receiving ETF shares step comprises receiving into a Depository Trust Company (DTC) account of the ETF, by one or more computers, the ETF shares.

19. The method of claim 1, further comprising authorizing a pricing agent or a consolidator to perform the calculating the IIV step.

20. The method of claim 1, wherein the identifying securities for the redemption event is performed by computer.

21. The method of claim 1, further comprising:
creating, by one or more computers, from the electronic record of the confidential portfolio of securities a plurality of different partial position electronic data records, with each of a plurality of the respective partial position electronic data records containing a subset of a respective quantity of an individual security identifier; and
electronically transmitting, by one or more computers, a plurality of the different partial position electronic data records to a plurality of pricing agents, with each respective partial position data record electronically transmitted to a different one of the pricing agents.

22. The method of claim 1, further comprising the AP representative transforming through liquidation the securities it has received for the AP in the redemption event into cash and/or other one or more legal instruments.

23. The method of claim 1, wherein the receiving ETF shares step in the redemption event comprises receiving, via a book entry transfer by a clearing agency, the ETF shares into an account for the benefit of the ETF, by one or more computers.

24. The method of claim 1, wherein the step of calculating, by one or more computers, an intraday indicative value (IIV), further comprises:
contracting with one or more pricing agents to perform the calculating the IIV step under confidentiality; and
providing contents of the confidential portfolio of securities in the ETF to one pricing agent or dividing the contents of the portfolio among two or more pricing agents for calculating the IIV.

25. The method of claim 1, further comprising:
appointing the AP representative.

26. The method of claim 1, wherein the electronic message is a DTC transfer message to move securities from one account to another account.

27. The method of claim 1, wherein the issuing one or more ETF shares step comprises causing the ETF shares to be transferred to an account of the AP representative.

28. The method of claim 1, further comprising:
creating, by one or more computers, from the electronic record of the confidential portfolio of securities a plurality of different partial position electronic data records, with each of a plurality of the respective partial position electronic data records containing a subset of a respective quantity of an individual security identifier;
electronically transmitting a plurality of the different partial position electronic data records to a plurality of pricing agents, with each respective partial position data record electronically transmitted to a different one of the pricing agents;
electronically receiving of partial pricing data from a plurality of the pricing agents; and
automatically computing, by one or more computers, the intraday indicative value (IIV).

29. The method of claim 28, wherein the plurality of partial position data records are encrypted prior to transmission.

30. The method of claim 28, further comprising:
including in the partial position electronic data record transmitted electronically to one of the pricing agents one or more erroneous stock identifiers.

31. The method of claim 1, further comprising:
the AP representative electronically receiving a cash transfer, the cash being a value equivalent of a creation basket of securities for one or more ETF shares;
the AP representative electronically receiving confidential creation-basket data records specifying a desired basket of securities for a creation event;
the AP representative responsively obtaining the desired basket of securities; and
the AP representative sending an electronic message, by one or more computers, to cause transfer of the desired basket of securities to the ETF.

32. The method of claim 31, wherein the AP representative obtains the desired basket of securities in the open market using the cash.

33. The method of claim 31, wherein the AP representative obtains the desired basket of securities by borrowing at least a portion of the desired basket of securities from a loaner of securities.

34. The method of claim 1, further comprising:
providing an electronic interface by one or more computers; and
wherein the sending an electronic message to transfer step comprises sending the electronic message, by one or more computers, to cause transfer of the securities via the electronic interface.

35. The method of claim 34, wherein the identifying securities for the redemption event is performed by computer.

36. The method of claim 34, further comprising the AP representative transforming through liquidation the securities it has received for the AP in the redemption event into cash and/or other one or more legal instruments.

37. The method of claim 1, wherein the entering an agreement step comprises providing an electronic legal agreement setting forth obligations of the AP representative to the AP.

38. The method of claim 1, further comprising:
selecting the AP representative.

39. The method of claim 1, further comprising:
approving the AP representative.

40. The method of claim 1, wherein the agreement is an exhibit in an ETF registration statement for the ETF filed with the Securities and Exchange Commission.

41. The method of claim 1,
wherein the receiving ETF shares step in the redemption event comprises receiving, via a book entry transfer by a clearing agency, into an account for the benefit of the ETF by one or more computers, the ETF shares.

42. The method of claim 41, wherein the identifying securities for the redemption event is performed by computer.

43. The method of claim 41, further comprising the AP representative transforming through liquidation the securities it has received for the AP in the redemption event into cash and/or other one or more legal instruments.

44. The method of claim 41, wherein the calculating step is carried out by an authorized pricing agent or an authorized consolidator.

45. The method of claim 41, wherein the identifying securities for the redemption event is performed by computer.

46. The method of claim 41,
wherein one or more electronic communications with the AP representative are made on a network through a security gateway, and, further comprising:
providing an electronic interface by one or more computers; and
wherein one or more of the sending, or issuing or receiving steps are performed via the electronic interface.

47. The method of claim 46, wherein the identifying securities for the redemption event is performed by computer.

48. The method of claim 46, further comprising the AP representative transforming through liquidation the securities it has received for the AP in the redemption event into cash and/or other one or more legal instruments.

49. The method of claim 46, wherein the step of calculating, by one or more computers, an intraday indicative value (IIV), further comprises:
contracting with one or more pricing agents to perform the calculating the IIV step under confidentiality; and
providing, by the one or more computers, contents of the confidential portfolio of securities in the ETF directly or indirectly to the one pricing agent or dividing the contents of the portfolio among two or more pricing agents for calculating the IIV.

50. The method of claim 49, wherein the identifying securities for the redemption event is performed by computer.

51. The method of claim 49,
further comprising the AP representative transforming through liquidation the securities it has received for the AP into cash and/or other one or more legal instruments,
wherein the receiving ETF shares step in the redemption event comprises receiving into an account of the ETF, by one or more computers, the ETF shares.

\* \* \* \* \*